United States Patent
Kilkkila

(10) Patent No.: US 6,895,505 B2
(45) Date of Patent: May 17, 2005

(54) METHOD AND SYSTEM FOR SELECTING A PASSWORD ENCRYPTED WITH A CORRECT SOFTWARE VERSION

(75) Inventor: Sami Kilkkila, Espoo (FI)

(73) Assignee: Nokia Corporation, Espoo (FI)

(*) Notice: Subject to any disclaimer, the term of this patent is extended or adjusted under 35 U.S.C. 154(b) by 764 days.

(21) Appl. No.: 09/976,352

(22) Filed: Oct. 11, 2001

(65) Prior Publication Data

US 2002/0061106 A1 May 23, 2002

Related U.S. Application Data

(63) Continuation of application No. PCT/FL00/00252, filed on Mar. 27, 2000.

(30) Foreign Application Priority Data

Apr. 13, 1999 (FI) .................................................. 990805

(51) Int. Cl.[7] .......................... G06F 11/30; G06F 12/14; H04L 9/32
(52) U.S. Cl. ......................... 713/189; 713/182; 713/183
(58) Field of Search ................................. 713/189, 182

(56) References Cited

U.S. PATENT DOCUMENTS 5,241,594 A 8/1993 Kung
6,421,781 B1 * 7/2002 Fox et al. .................... 713/201

FOREIGN PATENT DOCUMENTS

| EP | 0 279 232 A | 8/1988 |
|----|-------------|--------|
| EP | 0 994 616 A2 | 4/2000 |
| WO | 96/24230 | 8/1996 |
| WO | WO 99/01993 | 1/1999 |

* cited by examiner

Primary Examiner—Gregory Morse
Assistant Examiner—Christopher Brown
(74) Attorney, Agent, or Firm—Squire, Sanders & Dempsey L.L.P.

(57) ABSTRACT

Method and system for selecting a password encrypted with a correct software version in a telecommunication system. The system comprises a source system (LE1), a target system (LE2), and operation and maintenance network (OM), and an operation and maintenance center (OMC). In the method, log-on in the source system (LE1) is accomplished by supplying a user identification and a corresponding password. A remote session connection is set up via the operation and maintenance center (OMC) to the target system (LE2). The password encryption software versions in the target system (LE2) and in the source system (LE1) are compared with each other; and, if the password encryption software versions in the source and target systems differ from each other, the password belonging to the user identification in question associated with an earlier password encryption software version is sent to the target system (LE2).

6 Claims, 2 Drawing Sheets

Figure 1:
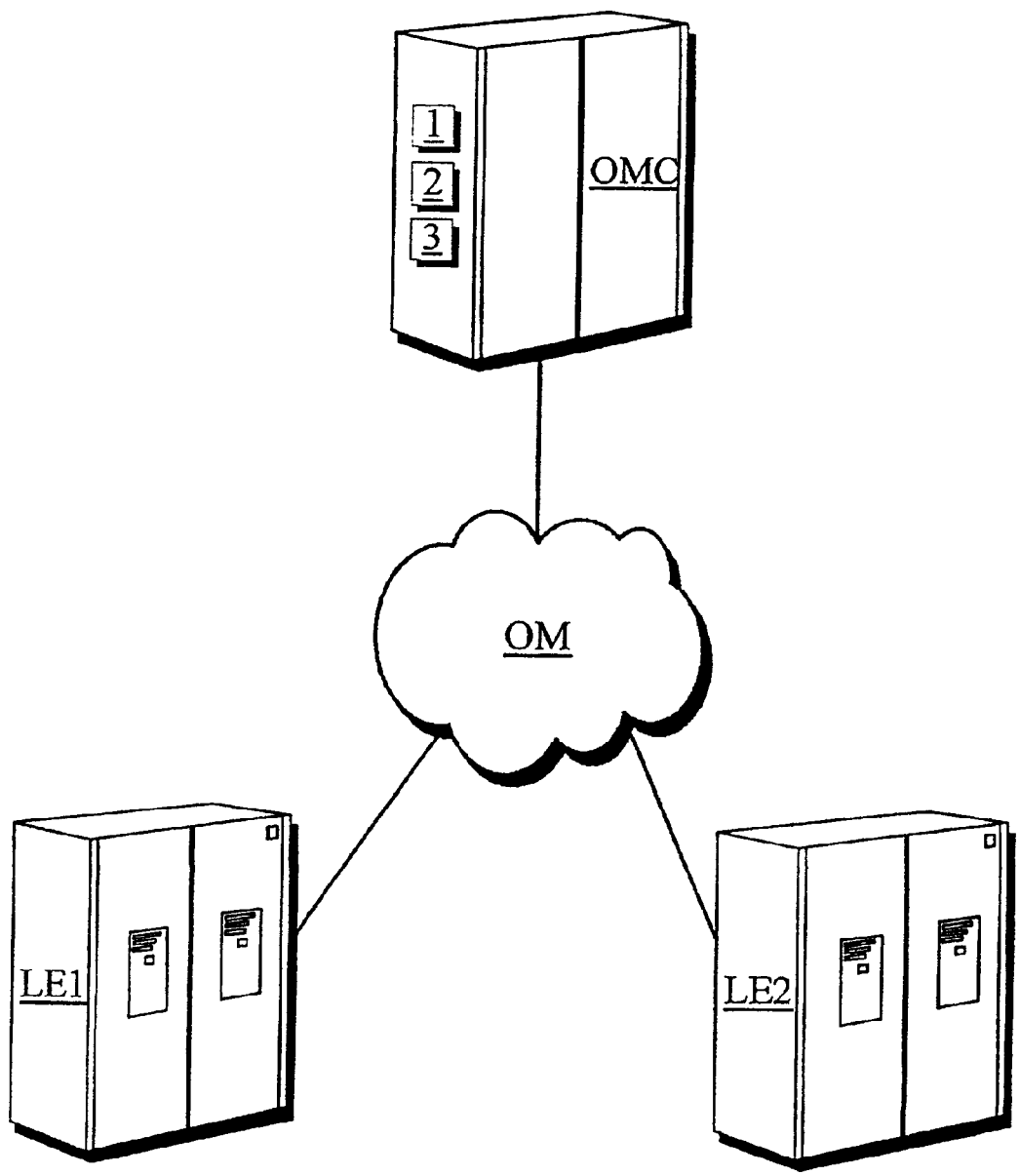

METHOD AND SYSTEM FOR SELECTING A PASSWORD ENCRYPTED WITH A CORRECT SOFTWARE VERSION

This application is a continuation of international application Ser. No. PCT/FI00/00252, filed 27 Mar. 2000.

FIELD OF THE INVENTION

The present invention relates to telecommunication systems. In particular, the invention relates to a new type of method and system for selecting a password encrypted with the right software version in a telephone exchange system.

BACKGROUND OF THE INVENTION

A telephone network generally consists of a plurality of separate telephone exchanges connected to each other via transmission lines. The telephone network is managed and maintained via an operation and maintenance network (O&M-network), which can be implemented e.g. on the basis of the services of an X.25 packet network. The operation and maintenance network is created by connecting to it the telephone exchanges and other network components to be controlled. The other network components to be controlled include e.g. the transcoder (TC), base transceiver station (BTS) and base station controller (BSC). The functions for operating the telephone network are mainly concentrated in control rooms and in network elements centralizing operation and maintenance functions. An example of centralizing network elements like this is the DX 200 OMC manufactured by Nokia.

From centralizing telephone network elements, it is possible to set up remote session connections to other telephone exchanges or telephone switching systems. When a remote session is established, the source system, i.e. e.g. a centralizing network element, sends user identification data, a user identification code and a password, to the target system. The target system is e.g. a telephone switching system.

In the DX 200 telephone switching system and in the user interface (Man Machine Interface, MMI) of the operation and maintenance network, the user's authority and rights are determined on the basis of the user identification (user ID). The MMI system is a certain aggregate of peripherals and software which can be used to execute operation and maintenance functions. For each user ID, an individual password has been defined for the verification of authenticity of the user. To minimize the data security risks, it is necessary to change the password frequently enough to ensure that a person not authorized to use a user ID will not be able to utilize a user ID not belonging to him/her.

In the above-mentioned system, the problem is that different network elements may have different versions of password encryption software. At present, user identification on a remote connection is so implemented that, if the software versions in the source system and in the remote system differ from each other, the user must enter the required password again when the remote session is started.

The object of the present invention is to eliminate the drawbacks referred to above or at least to significantly alleviate them.

A specific object of the invention is to disclose a new type of method and system which will obviate the need for re-input of a password, thus improving the convenience of use from the user's point of view.

As for the features characteristic of the present invention, reference is made to the claims.

SUBJECT OF THE INVENTION

The method of the invention concerns the selection of the manner of transmission of a password in a telecommunication network. The telecommunication system of the invention preferably comprises a source system, a target system, an operation and maintenance network established between the source and target systems and an operation and maintenance center connected to the operation and maintenance network. The source and target systems are e.g. telephone switching systems. In the method, log-on in the source system is accomplished by giving a user identification and a valid password corresponding to it. After the user ID has been entered, a remote session connection is set up via the operation and maintenance center to the target system. According to the invention, a check is carried out to establish whether the target system is using a different version of password encryption software than the source system. This check can be performed by both the source system and the target system.

In the source and/or target system, passwords associated with different versions of password encryption software have been stored. If the password encryption software version in the target system is an earlier version than that of the source system, then the password associated with the password encryption software version used in the target system is sent to the target system. Correspondingly, if the password encryption software version of the target system is newer, then the password associated with the password encryption software version in the source system is sent to it.

The system of the invention comprises means for comparing the password encryption software versions of the source and target systems with each other and means for sending to the target system a password consistent with an earlier software version, associated with the user ID in question.

In an embodiment of the invention, the system comprises means for storing in a certain predetermined space the passwords belonging to user identification codes, associated with different versions of password encryption software of the source and/or target system.

As compared with prior art, the present invention provides the advantage of making it unnecessary for the user to input the password again when establishing a remote connection to a target system. The password encryption software versions in the target and source systems are compared with each other and, based on this, the right password is selected.

LIST OF ILLUSTRATIONS

Figure 2:
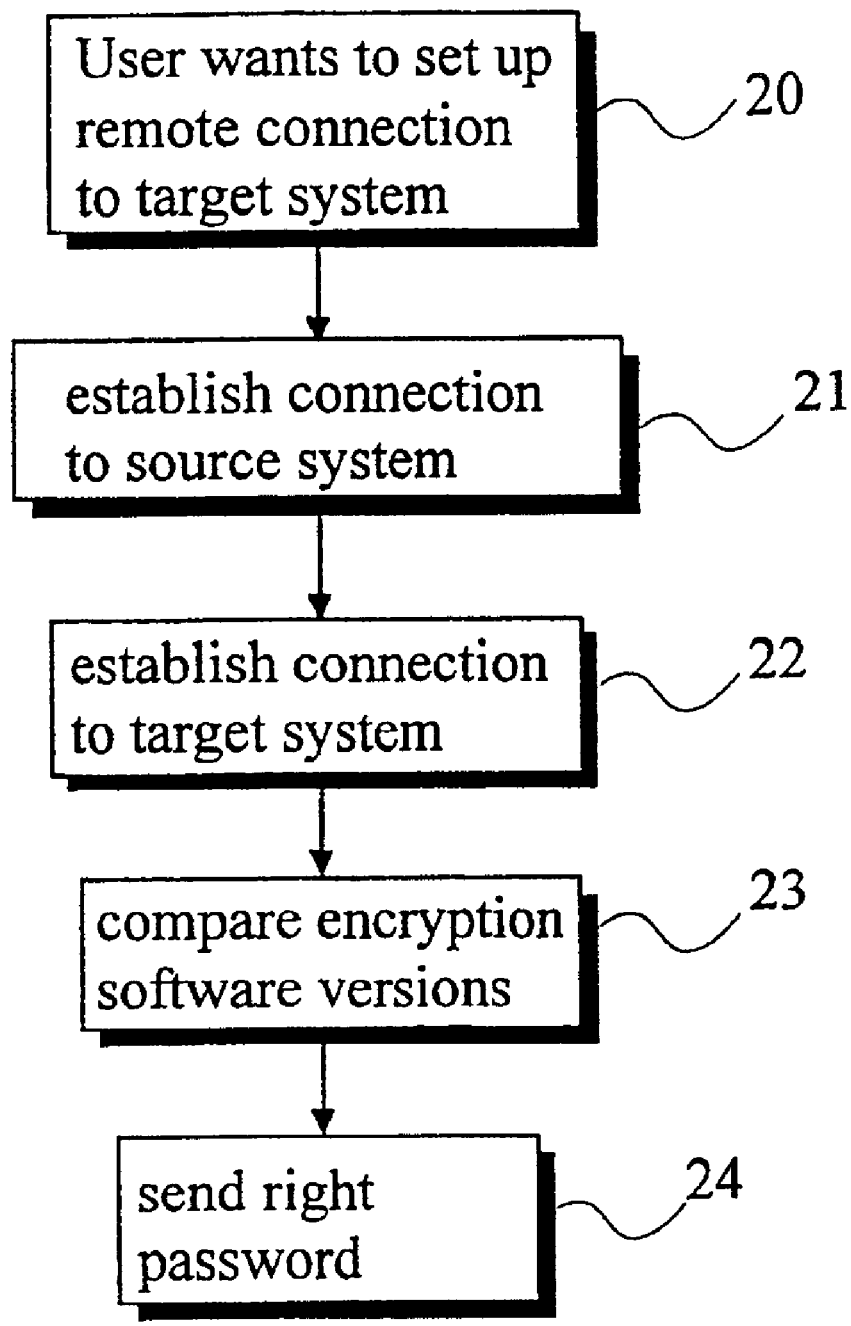

In the following, the invention will be described in detail by the aid of some of its embodiments with reference to the drawings, wherein FIG. 1 presents a preferred system according to the invention, and FIG. 2 presents an example of a flow diagram representing the establishment of a remote connection.

DETAILED DESCRIPTION OF THE INVENTION

The system presented in FIG. 1 comprises a source system LE1, a target system LE2, an operation and maintenance network OM established between the source and target systems (LE1, LE2) and an operation and maintenance center OMC connected to the operation and maintenance network OM. The source and target systems are preferably telephone switching systems. The telephone switching system is e.g. a DX 200 switching center manufactured by the applicant, and the operation and maintenance center OMC is e.g. a DX 200 OMC. In addition, the system comprises means 1 for comparing the password encryption software versions in the target system LE2 with each other and means 2 for sending to the target system LE2 the password consistent with an earlier software version, associated with the user identification in question. Moreover, the system comprises means 3 for storing the passwords belonging to user identification codes and associated with different versions of password encryption software of the source and/or target system (LE1, LE2) into a certain predetermined space.

FIG. 2 is a flow diagram representing an example of the establishment of a remote connection according to the invention. The user of the system wants to establish a remote connection to a target system he has selected, block 20. The user is e.g. an operator who is observing the operation of the system. The user logs on in the source system by supplying his user identification and the password corresponding to it, block 21. Each user identification is associated with closely defined rights assigned in advance. In other words, the user can only access functions agreed beforehand.

Further, a remote session connection to the desired target system is set up via the operation and maintenance center, block 22. Non-transparently to the user, the password encryption software versions in the source and target systems are compared with each other, block 23. This may result in one of three different situations, on the basis of which the right password to be sent to the target system is selected, block 24. In relation to the password encryption software version in the source system, the software version in the target system is the same, or later, or earlier.

In the first case, the password is sent in the normal manner to the target system.

In the second case, before the comparison of the passwords, the target system must be informed that the source system has an older software version, because otherwise the target system would consider the password incorrect and close the connection setup procedure. In the present case, the target system is aware of the variations in passwords associated with different software versions. Thus, the target system is able to compare the received password with the right password.

In the third case, the password encryption software version in the target system is older than that in the source system. In this case, before sending the password, the source system must find out which software version is in use in the target system. Having received this information, the source system can send the right password to the target system.

The invention is not restricted to the examples of its embodiments described above, but many variations are possible within the scope of the inventive idea defined in the claims.

What is claimed is:

1. Method for selecting a password encrypted with a correct software version in a telecommunication system comprising:

a source system;

a target system;

an operation and maintenance network established between the source and the target systems; and an operation and maintenance center connected to the operation and maintenance network, said method comprising the steps of:

logging on in the source system by supplying a user identification and a valid password corresponding to it, setting up a remote session connection via the operation and maintenance center to the target system, checking the password for correctness in the source and/or target system by comparing the password with a password stored in the source and/or target system, corresponding to the user identification.

wherein the method comprises the steps of:

comparing the password encryption software versions in the target system and in the source system with each other; and, if the password encryption software versions in the source and target systems differ from each other;

sending a password associated with the user identification in question and consistent with an earlier password encryption software version to the target system.

2. Method as defined in claim 1, wherein the password encryption software versions are compared in the source and/or target system.

3. Method as defined in claim 1, wherein passwords associated with different password encryption software versions are stored in a certain predetermined space in the source and/or target system.

4. System for selecting a password encrypted with a correct software version in a telecommunication system comprising:

a source system;

a target system;

an operation and maintenance network established between the source and the target systems; and an operation and maintenance center connected to the operation and maintenance network, in which system:

log-on in the source system is accomplished by supplying a user identification and a valid password corresponding to it, a remote session connection is set up via the operation and maintenance center to the target system, the password is checked for correctness in the source and/or target system by comparing the password with a password stored in the source and/or target system, corresponding to the user identification, wherein the system comprises:

means (1) for comparing the password encryption software versions with each other, and means (2) for sending to the target system a password consistent with the software version used in the target system, associated with the user identification in question.

5. System as defined in claim 4, wherein the system comprises means (3) for storing in a certain predetermined space the passwords associated with different versions of password encryption software of the source and/or target system and belonging to user identification codes.

6. System as defined in claim 4, wherein the source and/or target system is a telephone exchange system.

* * * * *